United States Patent [19]

Bartko et al.

[11] Patent Number: 4,857,259
[45] Date of Patent: Aug. 15, 1989

[54] NEUTRON DOSIMETER

[75] Inventors: John Bartko, Monroeville; Karl F. Schoch, Jr., Wilkins Township, Allegheny County; Thomas V. Congedo, Edgewood; Stanwood L. Anderson, Jr., Plum Boro, all of Pa.

[73] Assignee: Westinghouse Electric Corp., Pittsburgh, Pa.

[21] Appl. No.: 863,899

[22] Filed: May 16, 1986

[51] Int. Cl.$^4$ .............................................. G21C 17/00
[52] U.S. Cl. .................................. 376/154; 376/254; 376/255; 250/390.03
[58] Field of Search ............................. 250/390–392; 376/154, 245, 254–255, 183

[56] References Cited

U.S. PATENT DOCUMENTS

| | | |
|---|---|---|
| 3,588,505 | 6/1971 | Johnson, Jr. |
| 3,719,825 | 3/1973 | Snajdr ................................. 376/254 |
| 3,887,807 | 6/1975 | Poignant, Jr. et al. ......... 250/390 A |
| 3,928,127 | 12/1975 | Hiller ................................. 376/245 |
| 3,971,944 | 7/1976 | Quinby .............................. 250/391 |
| 4,027,051 | 5/1977 | Reuschel et al. ................. 376/183 |
| 4,042,454 | 8/1977 | Haas et al. ........................ 376/183 |
| 4,260,448 | 4/1981 | Herzer ............................... 376/183 |
| 4,277,307 | 7/1981 | Voss .................................. 376/183 |
| 4,379,118 | 4/1983 | Roche ............................... 376/154 |
| 4,491,605 | 1/1985 | Mazurek et al. .................. 427/38 |
| 4,498,007 | 2/1985 | Schwarzmann .................. 250/390 |
| 4,614,635 | 9/1986 | Terhune ............................ 376/154 |

FOREIGN PATENT DOCUMENTS 200882 of 1982 Japan.
2006176 5/1979 United Kingdom.

Primary Examiner—Salvatore Cangialosi
Attorney, Agent, or Firm—D. C. Abeles

[57] ABSTRACT

A neutron dosimeter and a method for neutron dosimetry involving a two-layer structure, one layer being a fissile material, and the other being a material which changes its conductivity in accordance with a density of implanted ions. Neutrons striking the fissile material result in the production of energetic ions, a determinable number of which implant themselves in the second layer and so alter its conductivity. Measurements of the conductivity of the second layer provide information from which neutron dose may be inferred.

10 Claims, 2 Drawing Sheets

NEUTRON DOSIMETER

BACKGROUND OF THE INVENTION

The measurement of neutron exposure in selected regions within or outside of a nuclear reactor pressure vessel (RPV) is of interest for several reasons. Measurement of neutron exposure outside of the RPV can be used to obtain a determination of the plant operational power level. Measurement of neutron exposure outside of the RPV can also be used to determine the spatial power distribution within the RPV. Furthermore, measurement of neutron exposure within or outside of the RPV can provide dosimetry information with respect to fast neutron exposure, from which resulting vessel embrittlement may be inferred.

The foregoing constitutes a broad range of applications, for which a variety of devices and techniques are currently employed. Detectors positioned outside of the rector core (typically $BF_3$ counters) are used to detect thermal neutrons for plant power/power distribution measurements. Passive activation samples are used for radiometric inference of vessel fluence from within vessel measurements. Passive samples containing both radiometric activation samples and solid state track recorders (SSTR) are used in outside of vessel measurements for inference of vessel fluence.

Detectors positioned outside of the reactor pressure vessel are typically online devices. The passive samples do not have online capability. Also, although test or sample devices positioned outside of the RPV are more accessible than those positioned within the RPV, their removal can typically be effected only during a shutdown. It is also currently necessary to transport the passive samples to a laboratory in order to obtain data from them.

Thus, based on the prior art, it can be said that features which have proven useful in neutron dosimetry include the following: (1) for power level/power distribution purposes, sufficient sensitivity to enable meaningful inference of intergrated neutron fluence over a period of minutes to hours; (2) for vessel dosimetry applications, a lifetime of years in a high radiation (neutron of gamma ray radiation) environment, with a relative insensitivity to gamma radiation; (3) also for vessel dosimetry applications, a capability of periodic online readout of integrated neutron dose (fluence), to provide data useful in forming decisions concerning the operation of the plant (e.g., heat up/cool down rates); and (4) capability of providing independent measurements of thermal and fast neutron flux.

SUMMARY OF THE INVENTION

The present invention resides in a method and apparatus for neutron dosimetry capable of providing virtually all of the features just mentioned. That is, the dosimeter has excellent neutron sensitivity, and is capable of adjustment in manufacture to cover both long-term and short-term applications, with relative insensitivity to beta and gamma radiation, and ability to provide spectral (i.e., both thermal and fast) neutron data, with a nondestructive readout and operating lifetimes as long as required (up to plant lifetime) in high radiation fields. Furthermore, the dosimeter is easily fabricated, and readout is easily effected, including online readout.

These and other advantages are achieved through provision of a dosimeter having a two-layer structure consisting of a layer of fissile material deposited on a layer of polymeric material which changes its electrical conductivity (subsequently referred to as "conductivity") in proportion to the density of ions implanted therein. Such polymeric materials are known, but have not in the past been used as component of a dosimeter as far as is known. The absorption of neutrons by nuclei of the fissile material gives rise to fission reactions in which the nuclei split into energetic fragments. Their motion through the material converts them into ions. A known percentage of these energetic ions then implant themselves in the polymeric material. Since ion production is proportional to incident neutron flux, and conductivity of the polymeric material is in turn proportional to the density of implanted ions, the neutron flux may be directly inferred from the change in conductivity of the polymeric material. A signal indicative of the conductivity of the polymeric material is easily generated, and converted into a form which is easily read or stored.

BRIEF DESCRIPTION OF THE DRAWINGS

The structure, operation, and advantages of a dosimeter according to the present invention will be more fully appreciated from the following detailed description read in conjunction with the drawings, in which.

DETAILED DESCRIPTION OF THE PREFERRED EMBODIMENTS

Figure 1:
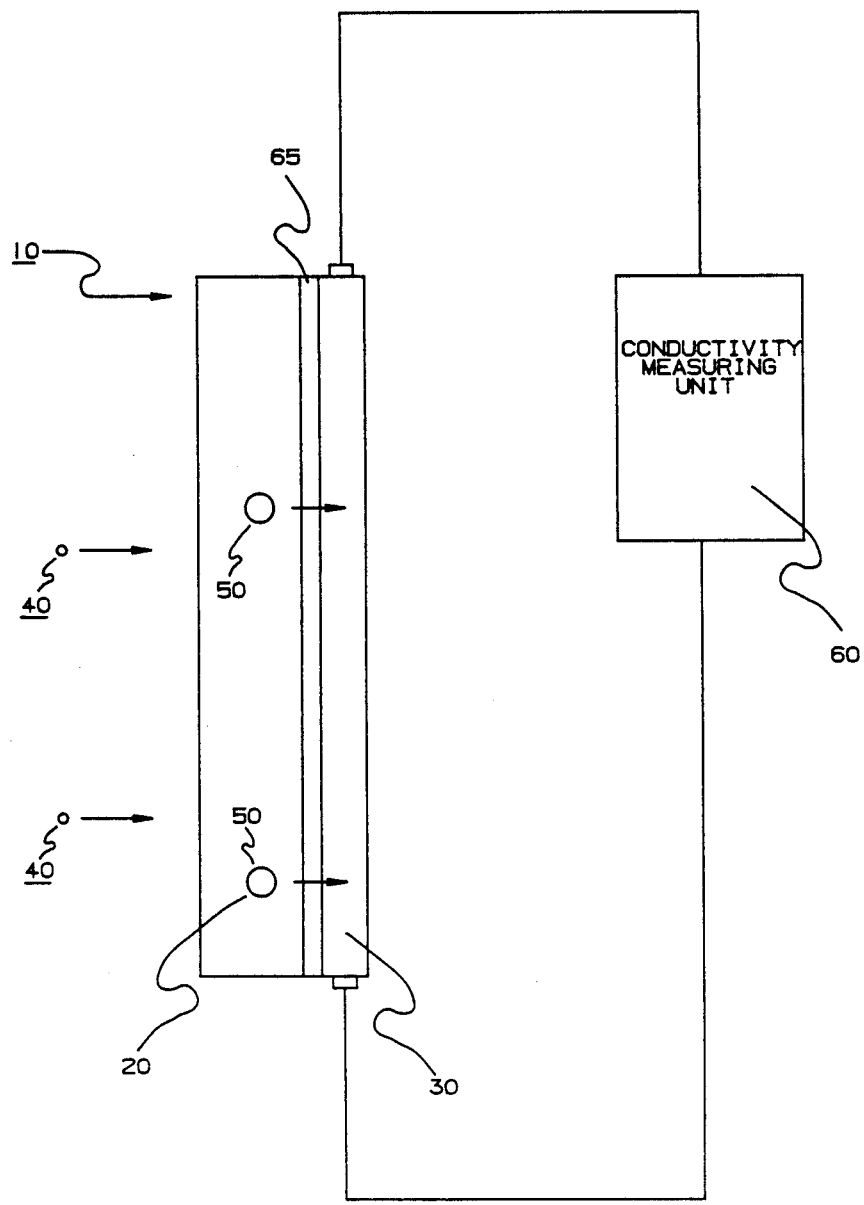
FIG. 1 is a schematic diagram of a dosimeter according to the present invention.

As shown in FIG. 1, a neutron dosimeter 10 has a first layer 20 and a second layer 30. The first layer is made out of a fissile material. As used herein, "fissile" is intended to define a group of materials which produce energetic ions via fission interactions with fast or thermal neutrons. Such materials include but are not limited to $^{235}U$, $^{239}Pu$, $^{238}U$, and $^{237}Np$. A nonconducting form of the fissile material, such as a ceramic, can most easily be used. Indeed, it would be apparent to one of ordinary skill in the art that many materials would serve well as or possibly in place of the fissile material, provided they generate sufficient numbers of ions of energy sufficient to implant themselves in a second layer as will be described below.

Sandwiched together with the first layer is a second layer 30. This second layer is made of a material which changes its conductivity in proportion to a concentration of implanted ions. For this reason, such material will be referred to as a CVI (Conductivity Varying with Ion implantation) material. Such materials include: poly (phenylene sulfide) (PPS); 3, 4, 9, 10-perylenetetracarboxylic dianhydride (PTCDA); 1, 4, 5, 8-naphthalenetetracarboxylic dianhydride (NTCDA); Ni phthalocyanine (NiPc); and poly [N, N'- (p, p'-oxydiphenylene) pyromellitimide] (Kapton H). Of course, it will be apparent to one of ordinary skill in the art that other materials may suffice. These materials change thier conductivity on the basis of impurities, introduced either through doping techiques or through ion implantation. These materials are described, for example, in U.S. Pat. No. 4,491,605 to Mazurek et al issued Jan. 1, 1985 and in articles by S. R. Forrest, et al., *Large Conductivity Changes in Ion Beam Iradiated Organic Thin Films*, APP. PHYS. LETT., Volume 41, No. 8, p. 708 (Oct. 1982); H. Mazurek, et al., *Electrical Prop-*

*erties of Ion-Implanted Poly (p-phenylene sulfide)*, J. OF POLYMER SCIENCE, Polymer Physics Edition, Volume 21, p. 537 (1983); and T. Hioki, et al., *Electrical and Optical Properties of Ion-Irradiated Organic Polymer Kapton H*, APPL. PHYS. LETT., Volume 43, No. 1, p. 30 (July 1983).

In practice, neutrons, indicated by numeral 40, impinge on and enter the fissile material, where they induce the production of ions 50. A determinable fraction of the ions propagate to the second layer 30 of CVI material, where an again determinable fraction implant themselves. This implantion induces a change in conductivity (specifically an increase in conductivity) in the second layer 30 of CVI material. This conductivity is then measured by a conductivity measuring unit 60. Conductivity measuring unit 60 may comprise any suitable device, such as a 4-point probe for measuring sheet resistivity.

The physics underlying the production of ions in the fissile layer is relatively well understood. Many types of neutron dosimeters now used commonly employ a layer of fissile material. The neutron capture results in fission fragment ions with energies on the order of 100 million electron volts (Mev). These energetic ions produce tracks in some dosimeters and in others they are used to ionize a gas.

Various fissile isotopes have different neutron energy thersholds for fission. For example, $^{235}U$ and $^{239}Pu$ can be made to fission by neutrons having energies from thermal (on the order of 0.01 ev) through fast (on the order of 1 Mev), while the fission cross sections of $^{238}U$ and $^{237}Np$ show distinct fission thresholds versus neutron energy (on the order of 0.08 Mev for $^{237}Np$ and on order of 1.5 Mev for $^{238}U$). Thus, proper selection of the fissile material makes it possible to obtain neutron spectral information, i.e., the energy distribution of impinging neutrons. Also, the use of cadmium coatings, which show near complete neutron absorption below 0.41 eV, can supply information sufficient to form an inference of thermal flux by comparison of data from coated versus uncoated samples. Such a method is currently known in connection with $^{59}Co$ neutron activation in vessel dosimetry for inference of damage.

In sharp contrast to the understanding of the physics underlying production of ions in the fissile material, the mechanism by which certain polymers can become conducting depending on the presence of impurities is still imperfectly understood. It is known, however, that the ions in their interactions with the polymer atoms break bonds thus forming free radicals. The radicals then combine and form small conducting "islands". As the dose level increases the islands grow in size and number and their average distance of separation decreases. At some point the sizes of, numbers of, and distances between the islands reach values which permit the conductivity to increase. In one proposed model, the electrons "hop" from one island to another. The temperature dependence of the induced conductivity would tend to substantiate this model. During the course of radiation, gases tend to escape the polymer, leading to denser and darker polymer surface.

The rate of change of conductivity of the polymer is dependent on several factors. The first and most obvious factor is the identity of the polymer itself. Various polymers have been investigated, and each displays a different threshold dose at which conductivity begins to change. This is presumably dependent upon the ease or difficulty of forming free radicals in the material. Again, this varation of threshold dose creates the possibility that different polymers having different sensitivies can be used for different neutron fluxes.

The second factor which apears to be of importance is the mass of the implanted ion. Ions with larger masses have a higher maximum ionization rate, i.e., a higher maximum energy deposited per unit volume. Thus, more free radicals are created per unit volume, thus enhancing the probability of forming conducting islands.

For some applications, the rate of change of conductivity of unimplanted polymer may not be sufficiently great to provide sufficiently sensitive measurements. At least some CVI materials, however, tend to change conductivity more rapidly as ion implantation increases. Thus, it is possible to "precondition" the CVI material by pre-implanting ions in it to obtain a rate of change of conductivity with additional ion implantation which is sufficiently great to provide sufficiently sensitive measurements.

If a conducting form of the fissile material is used, then it is also desirable to interpose between the first layer and second layer a third layer 65 of an electrically insulating material so that the conductivity of the first layer does not interfere with the measurement of the conductivity of the second layer. Of course, if an electrically nonconducting first layer is used, such as ceramic material, then it is not necessary to provide an intervening electrically insulating layer 65.

Figure 2:
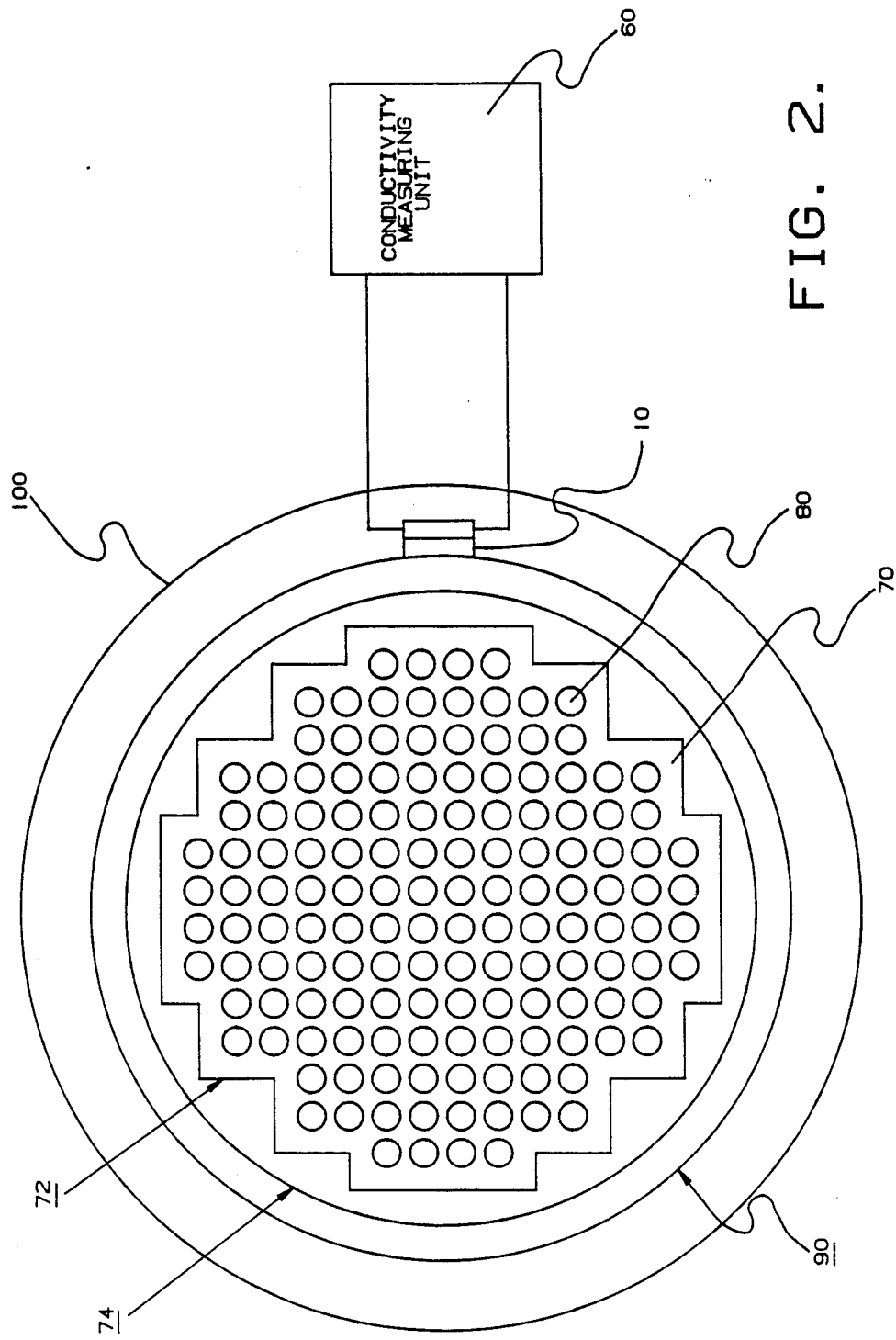
FIG. 2 is a schematic diagram of the dosimeter of FIG. 1 in a typical environment of use.

FIG. 2 shows one potential application of a dosimeter according to the present invention. The numeral 70 designates generally a reactor core, comprising a matrix of fuel rods 80. The reactor core 70 is surrounded sequentially by a baffle 72, a core barrel 74, and a thermal shield 90. Positioned within the rector vessel, but outside the thermal shield, is a neutron dosimeter 10, electrically connected to a conductivity measuring unit 60.

As an estimate of design parameters in this application, the fast neutron flux at a location such as that depicted in FIG. 2 might be as low as on the order $10^{10}$ $n/cm^2/sec$. The reaction rate at such location thus would be $3 \times 10^{-15}$ reactions/atoms/sec for $^{238}U$. The thicker that a one square centimeter layer of this material is, the more reactions will be produced. This provides yet another mechanism for controlling the sensitivity of the detector up to some maximum useful thickness. For $^{238}U$, the ranges of 100 Mev fission fragments lie between 5 and 9 microns. Thus, a maximum useful thickness would be approximately 5 microns. A 1 $cm^2$ layer of $^{238}U$, 5 microns thick, contains on the order of $2.4 \times 10^{19}$ atoms. After a day at the aforementioned reaction rate, it would be expected that on the order of $6 \times 10^9$ reactions would occur. After a month and a year, $2 \times 10^{11}$ and $2.3 \times 10^{12}$ reactions/$cm^2$ would have accrued.

As mentioned above, sensitivity will also depend on the selection of the CVI material, and whether the CVI material is perconditioned. The flexibility in design makes it possible to produce variation in conductivity as a function of neutron dose per unit area. Measurement could be automated with an instrument constructed to measure conductivity and provide a dose readout. For on-line applications, it would be necessary to shield gamma radiation from affecting the readout.

The foregoing description has been in terms of a preferred embodiment merely for the purposes of illustrating the underlying principles of the invention. Nothing in the foregoing should be construed as limiting the invention to the specific embodiments discussed. Instead, it will be apparent to one of ordinary skill in the art that the concepts underlying the particular embodiment discussed herein have extremely broad application. Therefore, the invention should not be regarded as being limited to these specific embodiments, but instead should be regarded as commensurate in scope with the underlying concept, as reflected in the following claims.

We claime:

1. A neutron dosimeter comprising:
   (a) a first layer, made of a fissile material, for producing energetic ions in response to neutron radiation; and
   (b) a second layer positioned to receive the energetic ions from said first layer, said second layer comprising a material having an electrical conductivity which permanently varies as a function of its cumulative ion radiation dose;
   (c) means, electrically connected to said second layer, for indicating the conductivity of said material.

2. A neutron dosimeter as claimed in claim 1 wherein said second material comprises an organic polymer.

3. A neutron dosimeter comprising:
   (a) a first layer, made of a fissile material, for producing energetic ions in response to neutron radiation; and
   (b) a second layer positioned to receive the energetic ions from said first layer, said second layer comprising and organic polymer material having an electrical conductivity which permanently varies as a function of its cumulative ion radiation dose;
   wherein said organic polymer is from the group consisting of PPS, PTCDA, NTCDA, NiPc, and Kapton H.

4. A neutron dosimeter as claimed in claim 1 wherein said fissile material is from the group consisting of $^{235}U$, $^{239}Pu$, $^{238}U$, and $^{237}Np$.

5. A neutron dosimeter as claimed in claim 1 further comprising an electrically insulating layer between said first and second layers.

6. A neutron dosimeter as claimed in claim 1 wherein said fissile material comprises an electrically insulating ceramic material.

7. A method of measuring neutron fluence using a dosimeter having first and second layers comprising the steps of:
   (a) generating in said first layer energetic ions in proportion to a neutron flux;
   (b) irradiating in said second layer a material, the electrical conductivity of which permanently varies as a function of its cumulative ion radiation dose of said energetic ions; and
   (c) measuring an electrical conductivity change in said material induced by said cumulative ion radiation dose.

8. A method as claimed in claim 7 wherein said generating step further comprises irradiating a fissile material with said neutron flux.

9. A neutron dosimeter comprising:
   (a) means for generating ions in proportion to a neutron fluence to be measured; and
   (b) means, disposed adjacent and opposite to said generating means, comprising a material for permanently changing electrical conductivity as a function of cumulative ion radiation dose;
   (c) means, electrically connected to said means for permanently changing electrical conductivity, for indicating the conductivity of said material.

10. A nuclear reactor comprising:
    (a) a reactor core;
    (b) a thermal shield surrounding said reactor core;
    (c) a pressure vessel surrounding said thermal shield;
    (d) a neutron dosimeter positioned outside of said thermal shield, said neutron dosimeter comprising a layer of fissile material and a second layer made of a material having an electrical conductivity which permanently varies as a function of its cumulative ion radiation dose; and
    (e) means, outside said pressure vessel and electrically connected to said layer of second material, for measuring electrical conductivity of said layer of second material.

* * * * *